US008335984B2

(12) United States Patent
Myoki

(10) Patent No.: US 8,335,984 B2
(45) Date of Patent: Dec. 18, 2012

(54) INFORMATION PROCESSING FOR GENERATING PRINT DATA FOR VARIABLE-DATA PRINTING

(75) Inventor: Yutaka Myoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 12/864,226

(22) PCT Filed: Jun. 21, 2010

(86) PCT No.: PCT/JP2010/060926
§ 371 (c)(1),
(2), (4) Date: Jul. 22, 2010

(87) PCT Pub. No.: WO2011/001921
PCT Pub. Date: Jan. 6, 2011

(65) Prior Publication Data
US 2011/0126091 A1    May 26, 2011

(30) Foreign Application Priority Data

Jul. 1, 2009    (JP) .................................. 2009-157318

(51) Int. Cl.
G06F 17/00    (2006.01)
(52) U.S. Cl. ......... 715/239; 715/221; 715/225; 715/226
(58) Field of Classification Search .................. 715/239, 715/249
See application file for complete search history.

(56) References Cited

U.S. PATENT DOCUMENTS

| 7,096,422 B2 * | 8/2006 | Rothschiller et al. ......... 715/212 |
| 2004/0109175 A1 | 6/2004 | Hatori et al. |
| 2004/0172590 A1 | 9/2004 | Rothschiller et al. |
| 2005/0039119 A1 * | 2/2005 | Parks et al. .................... 715/515 |
| 2005/0094207 A1 * | 5/2005 | Lo et al. ....................... 358/1.18 |

(Continued)

FOREIGN PATENT DOCUMENTS

| JP | 2004265405 A | 9/2004 |
| JP | 2006323813 A | 11/2006 |

OTHER PUBLICATIONS

Rice, Frank, Creating XML Mappings in Excel 2003, [online], Microsoft Corporation, <URL:http://msdn.microsoft.com/en-us/library/aa203737(office.11).aspx>, Feb. 28, 2005.

(Continued)

Primary Examiner — Adam M Queler
Assistant Examiner — Howard Cortes
(74) Attorney, Agent, or Firm — Fitzpatrick, Cella, Harper & Scinto

(57) ABSTRACT

An information processing apparatus that generates print data for variable-data printing by applying internal data to a variable-data printing document, the information processing apparatus comprises a markup language data structure display means configured to read markup language data structure information, and displays a structure that markup language data has; a record level element designation acceptance means configured to accept, from a user, designation of a record level element used as a record level that indicates a record unit in the structure of the markup language data displayed by the markup language data structure display means; and a markup language data structure conversion means configured, in order to apply the markup language data based on the markup language data structure information, as the internal data, to the variable-data printing document, to convert the record level element so as to have a structure of the internal data.

10 Claims, 16 Drawing Sheets

U.S. PATENT DOCUMENTS

| | | | |
|---|---|---|---|
| 2006/0004844 A1* | 1/2006 | Rothschiller et al. | 707/102 |
| 2006/0117251 A1 | 6/2006 | Rothschiller et al. | |
| 2006/0150085 A1 | 7/2006 | Davis et al. | |
| 2006/0195454 A1 | 8/2006 | Davis et al. | |
| 2006/0195783 A1 | 8/2006 | Davis et al. | |
| 2007/0011184 A1* | 1/2007 | Morris et al. | 707/101 |
| 2007/0253027 A1* | 11/2007 | Hiebert | 358/1.18 |
| 2008/0147605 A1* | 6/2008 | Bensalah et al. | 707/3 |

OTHER PUBLICATIONS

Dodge, Mark, "Microsoft Office Excel 2003 official manual, Nikkei BP Softpress", Jul. 12, 2004, pp. 285-292.

PCT Search Report and Written Opinion of the International Searching Authority, mailed Jul. 27, 2010, in PCT/JP2010/060926.

* cited by examiner

FIG. 4A

```
CUSTOMER_ID, SURNAME, NAME, GENDER, AGE
00001, TANAKA, TARO, MALE, 20
00002, SUZUKI, HANAKO, FEMALE, 30
00003, SATO, SABURO, MALE, 40
00004, TAKAHASHI, YOSHIE, FEMALE, 50
```

FIG. 4B

```xml
<?xml version="1.0"?>
<xsd:schema xmlns:xsd="http://www.w3.org/2001/XMLSchema">
  <xsd:element name="orders" type="xsd:string">
    <xsd:element name="order" type="xsd:string" maxOccurs="unbounded">
      <xsd:complexType>
        <xsd:sequence>
          <xsd:element name="customer_id" type="xsd:string"/>
          <xsd:element name="address" type="xsd:string">
            <xsd:complexType>
              <xsd:sequence>
                <xsd:element name="zip" type="xsd:string"/>
                <xsd:element name="prefecture" type="xsd:string"/>
                <xsd:element name="city" type="xsd:string"/>
                <xsd:element name="street" type="xsd:string"/>
                <xsd:element name="tel" type="xsd:string"/>
              </xsd:sequence>
            </xsd:complexType>
          </xsd:element>
        </xsd:sequence>
      </xsd:complexType>
      <xsd:element name="customer_order" type="xsd:string">
        <xsd:complexType>
          <xsd:element name="product_name" type="xsd:string"/>
          <xsd:element name="order_date" type="xsd:date"/>
        </xsd:complexType>
      </xsd:element>
    </xsd:element>
  </xsd:element>
</xsd:schema>
```

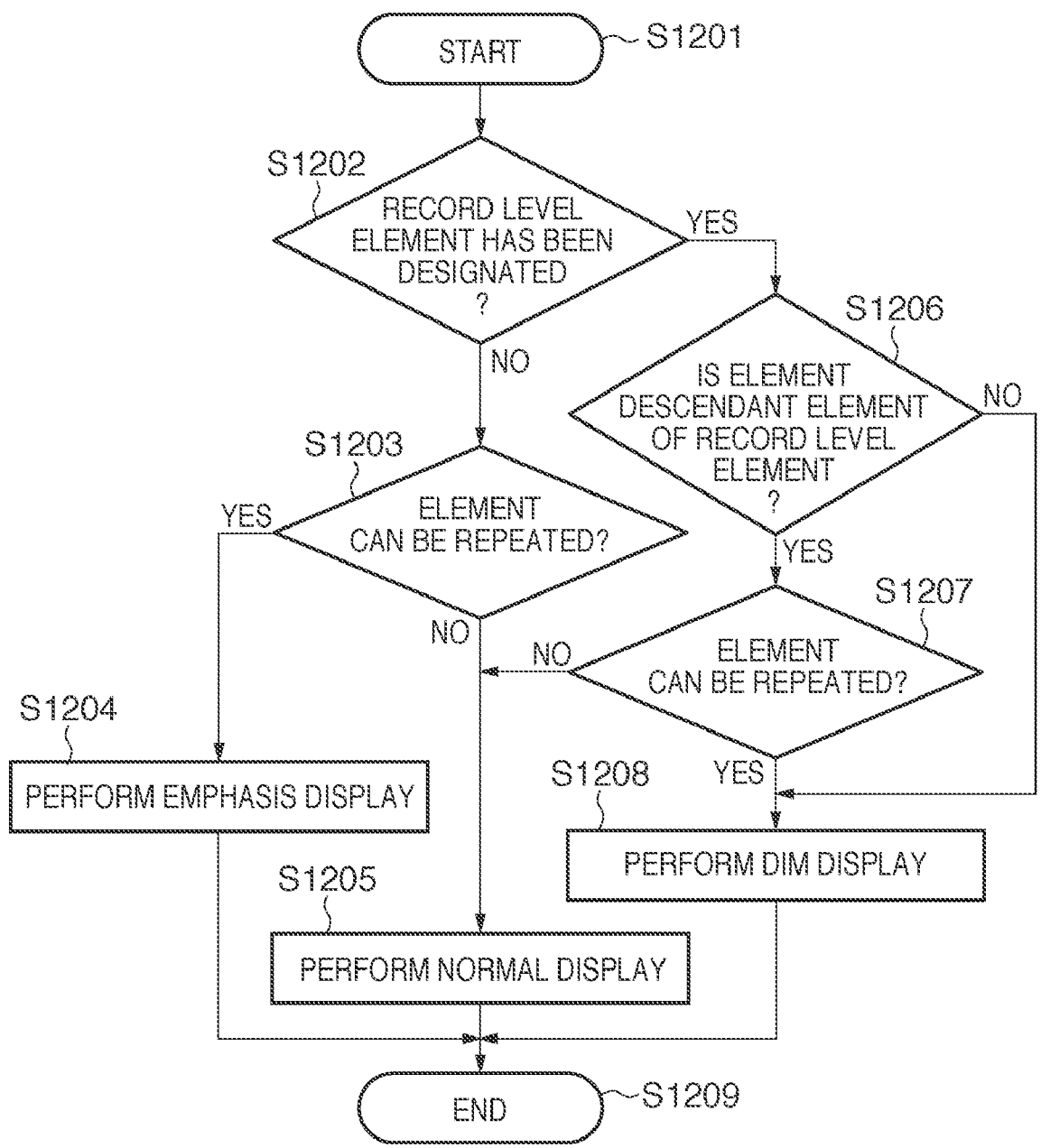

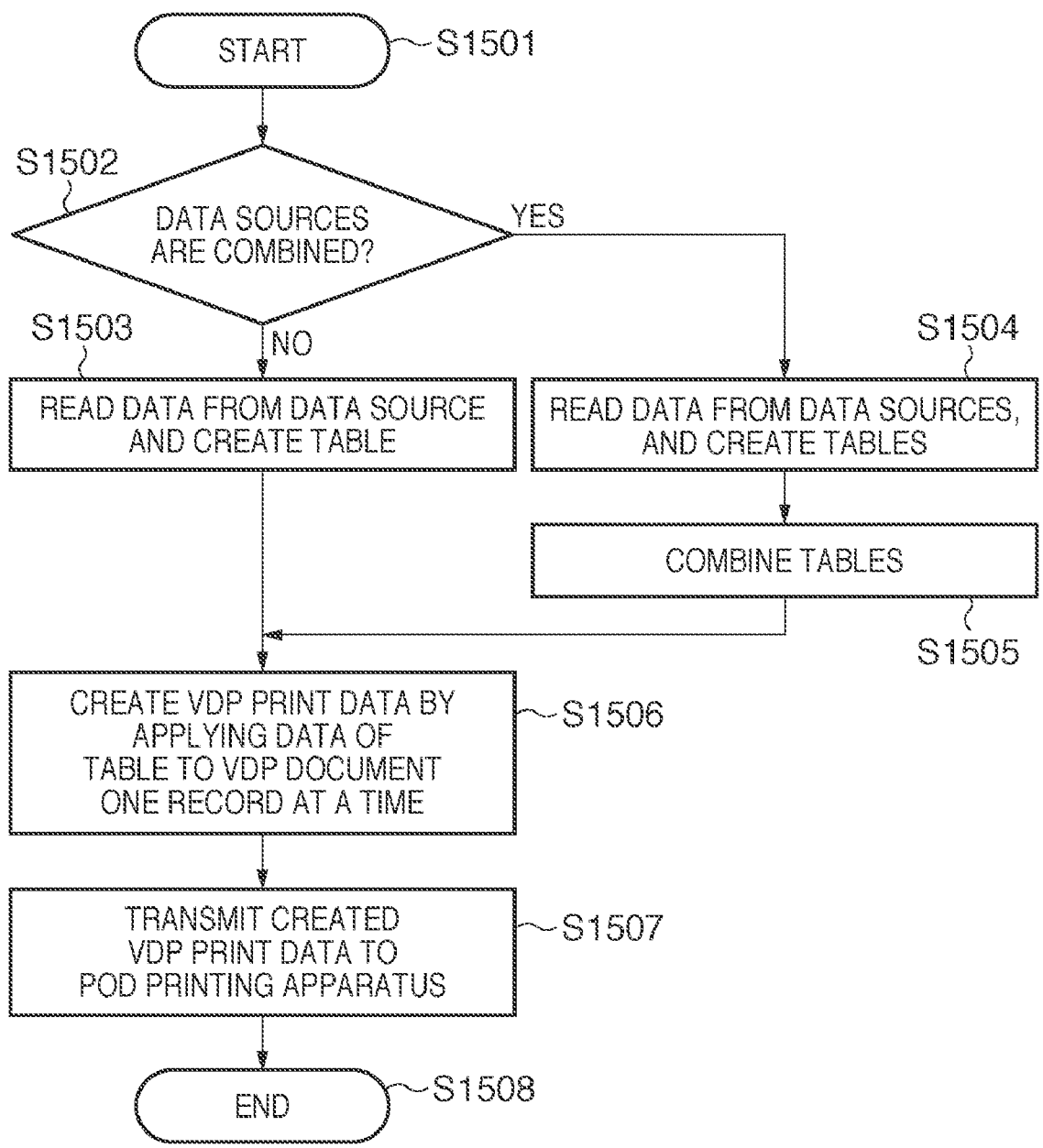

FIG. 11A

```xml
<orders>   ~1801
  <order>
    <customer_id>00001</customer_id>  ~1802
    <address>                          ~1803
      <zip>111-1111</zip>
      <prefecture>HOKKAIDO</prefecture>
      <city>SAPPORO</city>
      <street>1-1-1 CHUO-KU</street>   ~1804
      <tel>111-111-1111</tel>
    </address>
    <customer_order>                   ~1805
      <product_name>ONE NOTEBOOK</product_name>
      <order_date>2009-01-01</order_date>  ~1806
    </customer_order>
  </order>
  <order>
    <customer_id>00002</customer_id>
    <address>
      <zip>222-2222</zip>
      <prefecture>TOKYO</prefecture>
      <city>CHUO-KU</city>
      <street>2-2-2</street>
      <tel>222-222-2222</tel>
    </address>
    <customer_order>
      <product_name>TWO PENCILS</product_name>
      <order_date>2009-02-02</order_date>
    </customer_order>
  </order>
  <order>
    <customer_id>00003</customer_id>
    <address>
      <zip>333-3333</zip>
      <prefecture>OSAKA</prefecture>
      <city>OSAKA</city>
      <street>3-3-3 TENNOJI-KU</street>
      <tel>333-333-3333</tel>
    </address>
    <customer_order>
      <product_name>THREE BALL-POINT PENS</product_name>
      <order_date>2009-03-03</order_date>
    </customer_order>
  </order>
  <order>
    <customer_id>00004</customer_id>
    <address>
      <zip>444-4444</zip>
      <prefecture>FUKUOKA</prefecture>
      <city>FUKUOKA</city>
      <street>4-4-4 HAKATA-KU</street>
      <tel>444-444-4444</tel>
    </address>
    <customer_order>
      <product_name>FOUR ERASERS</product_name>
      <order_date>2009-04-04</order_date>
    </customer_order>
  </order>
</orders>
```

FIG. 12

Table 1901:

| | CUSTOMER_ID | CUSTOMER_SURNAME | CUSTOMER_NAME | CUSTOMER_GENDER | CUSTOMER_AGE |
|---|---|---|---|---|---|
| | 1902 | | | | |
| 1903 | 00001 | TANAKA | TARO | MALE | 20 |
| 1904 | 00002 | SUZUKI | HANAKO | FEMALE | 30 |
| 1905 | 00003 | SATO | SABURO | MALE | 40 |
| 1906 | 00004 | TAKAHASHI | YOSHIE | FEMALE | 50 |

Table 1907:

| | CUSTOMER_ID | CUSTOMER_ZIP_CODE | CUSTOMER_ADDRESS | ORDER_PRODUCT | ORDER_DATE |
|---|---|---|---|---|---|
| | 1908 | | | | |
| 1909 | 00001 | 111-1111 | 1-1-1 CHUO-KU | ONE NOTEBOOK | 2009-01-01 |
| 1910 | 00002 | 222-2222 | 2-2-2 | TWO PENCILS | 2009-02-02 |
| 1911 | 00003 | 333-3333 | 3-3-3 TENNOJI-KU | THREE BALL-POINT PENS | 2009-03-03 |
| 1912 | 00004 | 444-4444 | 4-4-4 HAKATA-KU | FOUR ERASERS | 2009-04-04 |

Table 1913:

| | CUSTOMER_ID | CUSTOMER_SURNAME | CUSTOMER_NAME | CUSTOMER_GENDER | CUSTOMER_AGE | CUSTOMER_ZIP_CODE | CUSTOMER_ADDRESS | ORDER_PRODUCT | ORDER_DATE |
|---|---|---|---|---|---|---|---|---|---|
| | 1914 | | | | | | | | |
| 1915 | 00001 | TANAKA | TARO | MALE | 20 | 111-1111 | 1-1-1 CHUO-KU | ONE NOTEBOOK | 2009-01-01 |
| 1916 | 00002 | SUZUKI | HANAKO | FEMALE | 30 | 222-2222 | 2-2-2 | TWO PENCILS | 2009-02-02 |
| 1917 | 00003 | SATO | SABURO | MALE | 40 | 333-3333 | 3-3-3 TENNOJI-KU | THREE BALL-POINT PENS | 2009-03-03 |
| 1918 | 00004 | TAKAHASHI | YOSHIE | FEMALE | 50 | 444-4444 | 4-4-4 HAKATA-KU | FOUR ERASERS | 2009-04-04 |

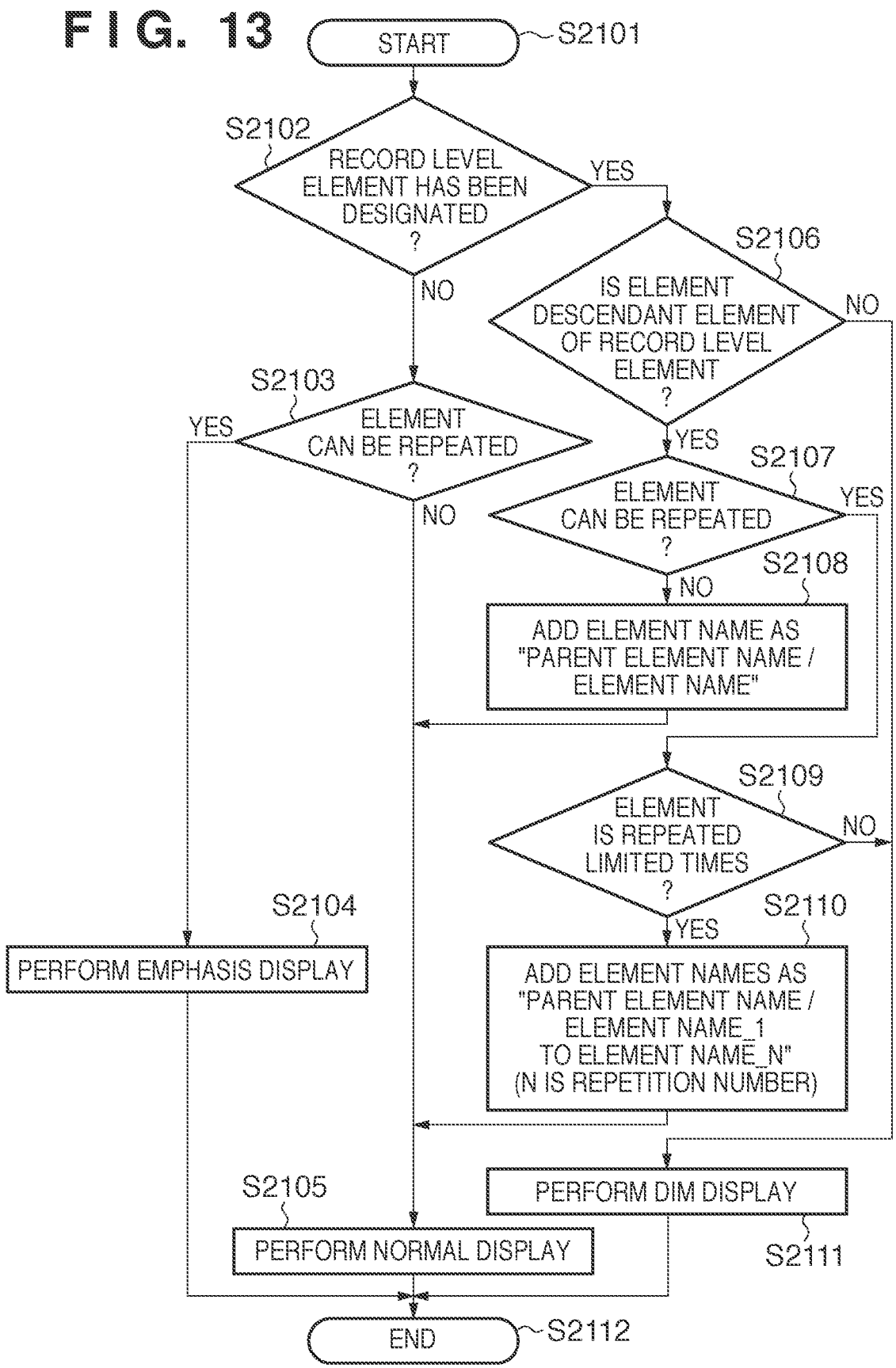

INFORMATION PROCESSING FOR GENERATING PRINT DATA FOR VARIABLE-DATA PRINTING

This application is a National Stage application under 35 U.S.C. §371 of International Application No. PCT/JP2010/060926, filed on Jun. 21, 2010, which claims priority to Japanese Application No. 2009-157318, filed on Jul. 1, 2009, the contents of each of the foregoing applications being incorporated by reference herein.

TECHNICAL FIELD

The present invention relates to an information processing apparatus, a control method, and a program. In particular, the present invention relates to a technique to merge data obtained from a database into a template document whereby the relation to a data source is described, and to generate and print variable-data printing data.

BACKGROUND ART

In recent years, the market for "Print On Demand" (hereinafter, POD) has been expanding with the advent of high-speed, high-quality electrophotographic printing apparatuses and inkjet printing apparatuses. In POD, digital printing using electronic data is performed with maximum utilization of digital image forming apparatuses, such as digital copiers and digital multi-function peripherals. Thus, POD aims to enable handling relatively small-volume jobs in a short turnaround time.

In POD, a printing method known as variable-data printing (hereinafter, VDP) is performed, which takes advantage of the characteristics that electronic data is used. In a VDP document used in VDP, fixed portions and variable portions are specified, and data for the variable portions is supplied from a data source such as an RDB (Relational Database) or a CSV (Comma Separated Values) file. Here, columns (fields) of the data source are associated with variable portions of a template document, and data of the data source is applied thereto row by row (record by record), and thus documents with content in which only the variable portions differ are printed.

Here, XML data is an example of data in a format that differs from the formats of data supplied from an RDB and a CSV file. XML data is supplied from a data source such as an XML file or an XML database. With regard to XML data, for example, Japanese Patent Laid-Open No. 2006-323813 discloses a technique for associating a specific node of XML data with a document content area by describing the node as an XPath. As another example, Japanese Patent Laid-Open No. 2004-265405 discloses a technique for mapping XML data to a spreadsheet. However, the above techniques are not applicable to a VDP document since the concept of rows (records) of a data source cannot be represented in those techniques.

VDP needs flexibility so that various data sources can be handled and also freely combined, in order to satisfy various demands from users. However, XML data supplied from a data source such as an XML file or an XML database does not have a data structure represented with rows and columns (two dimensions), like an RDB or a CSV file. With VDP, columns (fields) of a data source are associated with the variable portion of the template document, and data of the data source is applied thereto row by row (record by record), and thus documents with slightly differing content are printed. Accordingly, XML data is not applicable to a VDP document if the structure thereof is kept as-is. Further, in the case of combining data sources, an operation of combining columns (fields) and rows (records) of data sources is necessary. Accordingly, it is also not possible for XML data and data supplied from an RDB or a CSV file to be combined and applied to a VDP document.

SUMMARY OF INVENTION

According to one aspect of the present invention, there is provided an information processing apparatus that generates print data for variable-data printing by applying internal data to a variable-data printing document, the information processing apparatus comprising: a markup language data structure display means configured to read markup language data structure information, and displays a structure that markup language data has; a record level element designation acceptance means configured to accept, from a user, designation of a record level element used as a record level that indicates a record unit in the structure of the markup language data displayed by the markup language data structure display means; and a markup language data structure conversion means configured, in order to apply the markup language data based on the markup language data structure information, as the internal data, to the variable-data printing document, to convert the record level element so as to have a structure of the internal data, for each unit based on the record level element designated by the record level element designation acceptance means.

According to another aspect of the present invention, there is provided a control method for an information processing apparatus that generates print data for variable-data printing by applying internal data to a variable-data printing document, the control method comprising: a step in which a markup language data structure display means of the information processing apparatus reads markup language data structure information, and displays a structure that markup language data has; a step in which a record level element designation acceptance means of the information processing apparatus accepts, from a user, designation of a record level element used as a record level that indicates a record unit in the structure of the markup language data displayed in the markup language data structure display step; and a step in which in order to apply the markup language data based on the markup language data structure information, as the internal data, to the variable-data printing document, a markup language data structure conversion means of the information processing apparatus converts the record level element so as to have a structure of the internal data, for each unit based on the record level element designated in the record level element designation acceptance step.

According to the present invention, it is possible to use a markup language that does not have a two-dimensional structure as a data source for generating VDP print data, and thus the versatility of data used as a data source improves. Further, user convenience can be improved in terms of recognizability and operability with respect to elements of a data source, as well.

Further features of the present invention will become apparent from the following description of exemplary embodiments with reference to the attached drawings.

BRIEF DESCRIPTION OF DRAWINGS

FIGS. 4A and 4B are diagrams showing examples of a CSV file and an XML schema file to be used according to the embodiment of the present invention.

FIG. 7 is a flowchart showing processing for displaying elements of an XML schema in the XML data source addition screen according to the embodiment of the present invention.

FIG. 9 is a flowchart showing processing performed at the time of VDP document printing according to the embodiment of the present invention.

FIGS. 11A and 11B are diagrams showing examples of an XML data file and its DOM tree according to a first embodiment.

FIG. 12 is a diagram showing examples of tables created from data sources according to the first embodiment, and a table created by combining the tables.

FIG. 13 is a flowchart showing processing according to a second embodiment.

DESCRIPTION OF EMBODIMENTS

First Embodiment

Below is a description of embodiments of the present invention with reference to the drawings. Although markup languages are the targets of the present invention, here, XML data is described as an example thereof. Therefore, it goes without saying that the scope of the present invention includes application to a markup language that is not described here.

Configuration of POD System

Figure 1A:
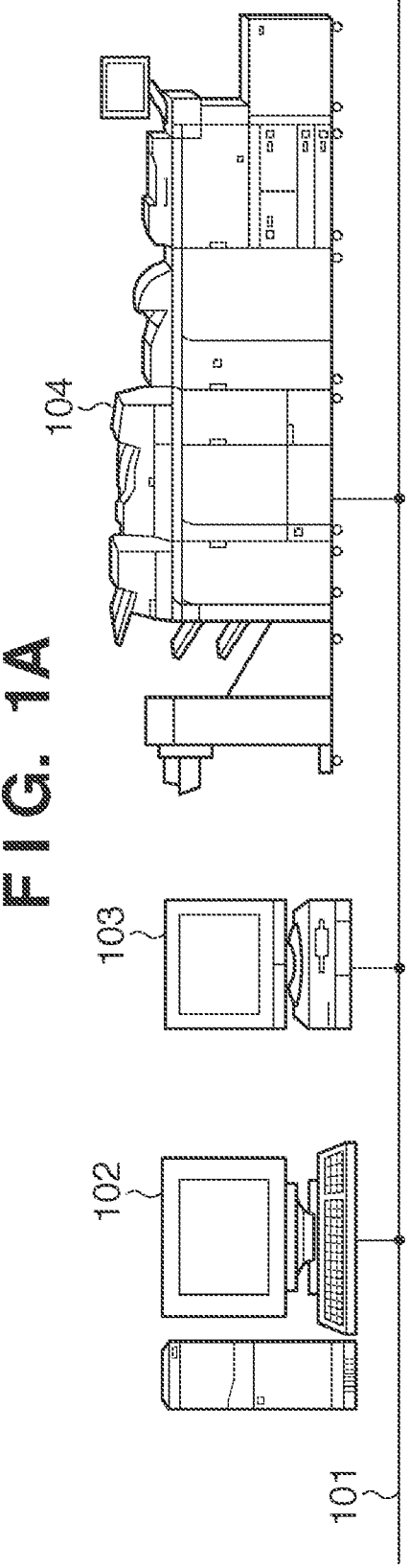
FIGS. 1A and 1B are diagrams showing examples of configurations of a POD system and an information processing apparatus according to an embodiment of the present invention.

FIG. 1A is a schematic diagram showing a configuration of a POD system according to an embodiment of the present invention. This POD system has a database server 102 and a client computer (PC) 103, which are information processing apparatuses, and a POD printing apparatus 104, and they are connected via a network 101.

It is possible to read and write data from/to the database server 102 via the network. The client PC 103 generates VDP (variable-data printing) print data using data obtained from the database server 102, and transmits the generated data to the POD printing apparatus 104. The POD printing apparatus 104 prints the received VDP print data.

Although the database server 102 and the client PC 103 are connected via the network in the embodiment of the present invention, the present invention is not limited to this. For example, the database server may be a service executed as a so-called cloud service on the Internet, or the database server and the client PC may be the same information processing apparatus.

Configuration of Information Processing Apparatus

Figure 1B:
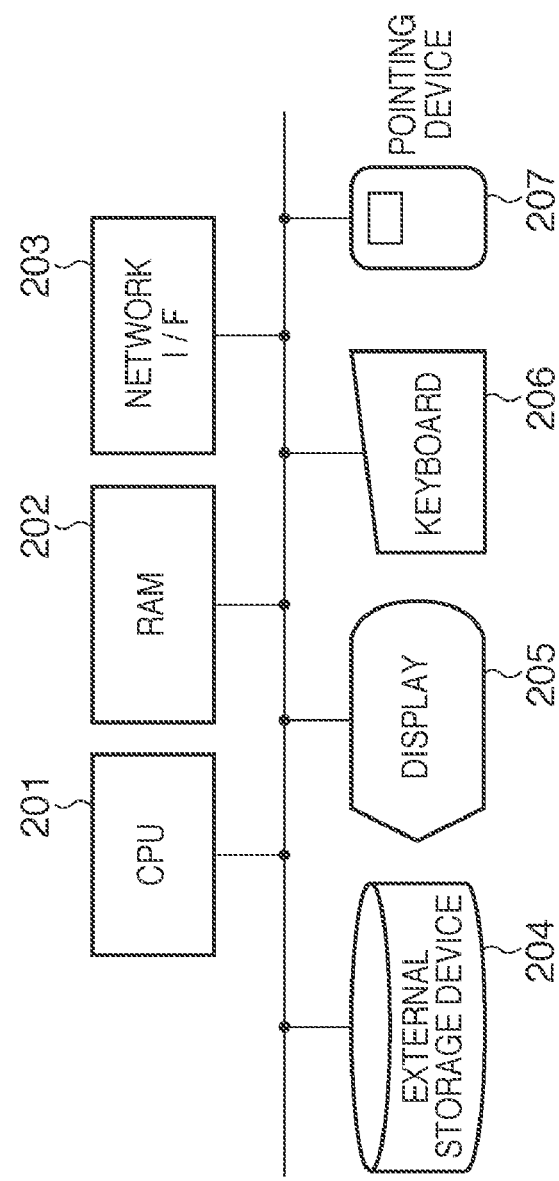

Next is a description of the configuration of an information processing apparatus according to the embodiment of the present invention with reference to FIG. 1B. FIG. 1B is a block diagram showing an example of a configuration of the database server 102 and the client PC 103. A CPU 201 performs overall control of the apparatus in accordance with a control program stored in a RAM 202. An internal storage unit 202 stores the control program for the apparatus executed by the CPU 201, and data such as documents and images. The internal storage unit 202 corresponds to a RAM, for instance. Under the control of the CPU 201, a network interface 203 establishes connections to a network, and transmits and receives data and the like. An external storage device 204 saves data. The external storage device 204 corresponds to a magnetic disk, or the like. Further, the configuration includes a display 205, a keyboard 206, and a pointing device 207 such as a mouse. In order to perform a predetermined operation, a program stored in the RAM 202 uses the functionality of an OS (Operating System) also stored in the RAM 202 when necessary. Further, the program stored in the RAM 202 reads and writes content of data temporarily stored in the RAM 202, reads and writes data from/to the external storage device 204, and transmits and receives data via the network interface 203. Further, the program stored in the RAM 202 receives input via the keyboard 206 and the pointing device 207, and performs display on the display 205.

The database server 102 stores a database in the external storage device 204. Further, when a database program stored in the RAM 202 receives a command to read and write data from/to the above database via the network interface 203, the CPU 201 executes the command, and transmits the result via the network interface 203. In the client PC 103, a VDP program stored in the RAM 202 accepts input via the keyboard 206 and the pointing device 207, creates a VDP document in the RAM 202, displays data on the display 205, and reads and writes data from/to the external storage device 204. Upon accepting a printing instruction via the keyboard 206 or the pointing device 207, the VDP program creates VDP print data in the RAM 202, and transmits the data to the POD printing apparatus 104 via the network interface 203.

Data Source Editing

Figure 2A:
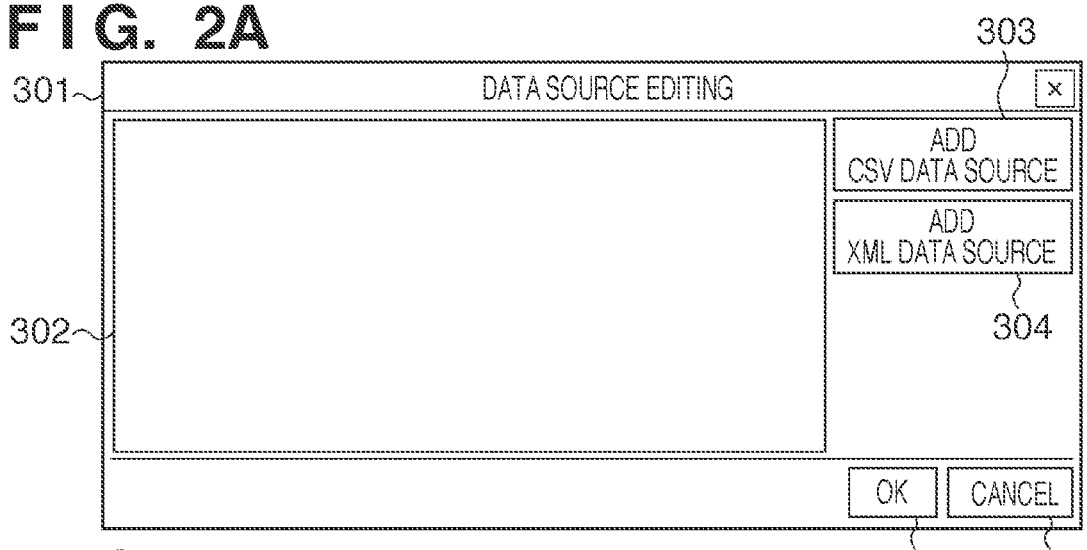
FIGS. 2A to 2C are diagrams showing examples of a data source editing screen according to the embodiment of the present invention.

Next is a description of a data source editing screen with reference to FIG. 2A. The VDP program in the client PC 103 according to the embodiment of the present invention accepts a processing instruction from a user, and displays a data source editing screen as shown in FIG. 2A on the display 205 if the instruction is for data source editing. A dialog box 301 is an interface for performing data source editing. In an area 302, an edited data source is displayed. A CSV data source addition button 303 is for the user to give an instruction to add a CSV file as a data source. An XML data source addition button 304 is for the user to give an instruction to add an XML file as a data source. An OK button 305 is for saving data source editing content, and ending the processing. A cancel button 306 is for discarding data source editing content, and ending the processing.

Note that although only a CSV file and an XML file are handled as data sources in the embodiment of the present invention, the present invention is not limited to this, and the data source may be an RDB database accessed via an interface such as ODBC or JDBC. Also, an XML database may be used. As another example, the data source may be a content management system such as a CMS (Content Management System) or a DAM (Digital Asset Management), or a file server.

CSV Data Source Addition

Next is a description of operation of the VDP program if the CSV data source addition button 303 is operated, with reference to FIGS. 3A, 3B, 4A, and 4B.

Figure 3A:
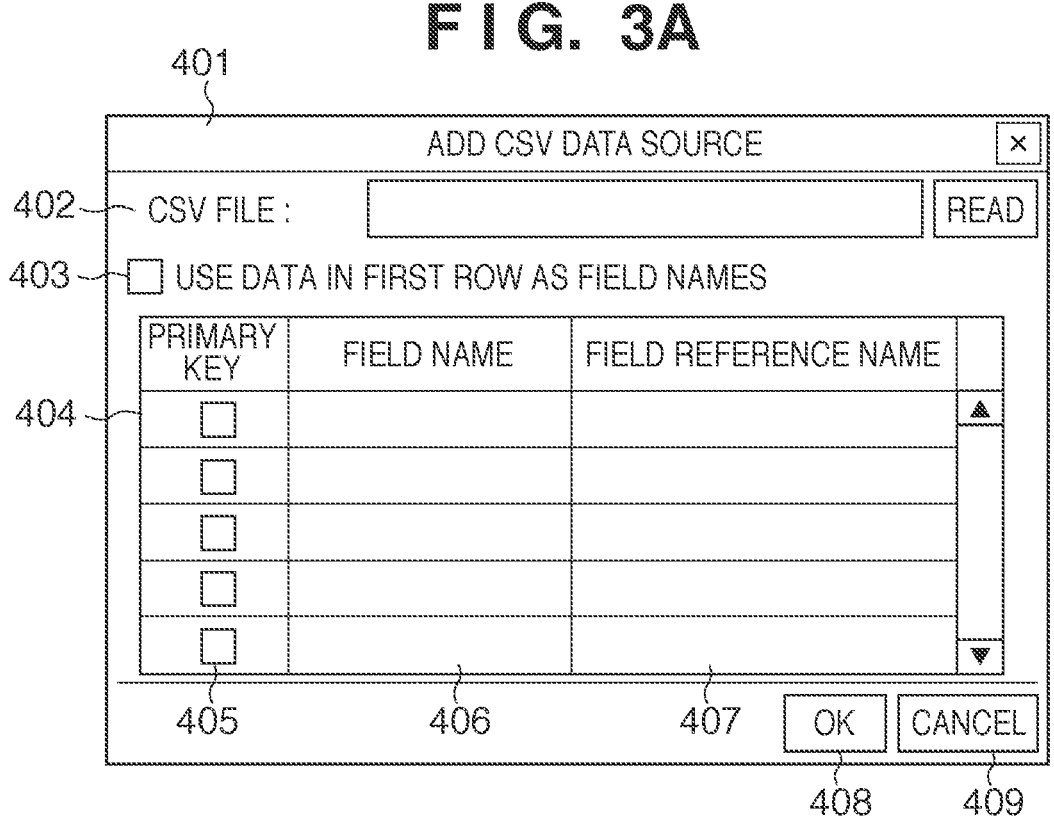
FIGS. 3A and 3B are diagrams showing examples of a CSV data source addition screen according to the embodiment of the present invention.

FIG. 3A shows a CSV data source addition screen displayed, on the display 205, by the VDP program in the client PC 103 according to the embodiment of the present invention if the CSV data source addition button 303 is operated. A dialog box 401 is used to add a CSV data source. A text input field and a read button 402 are for the user to designate a CSV file. A check box 403 is for the user to designate whether to use data in the first row of a CSV file as field names. An area 404 has an area 406 for displaying a field name of the CSV file designated using the text input field and read button 402, an area 405 for the user to designate a primary key, and an area 407 for the user to designate a field reference name. A primary key is a key that is designated in order to uniquely identify a record. An OK button 408 is for saving CSV data source addition content, and ending the processing. A cancel button 409 is for discarding CSV data source addition content, and ending the processing.

FIG. 4A shows an example of a CSV file used in the embodiment of the present invention. The CSV file is stored in the external storage device 204 of the database server 102, and can be accessed using a UNC notation path, here, "¥¥databaseserver¥customermaster.csv". Data in the first row is used as field names, and the field names, namely "customer ID", "surname", "name", "gender", and "age", are respectively designated using comma separation. In the second and following rows, data is designated in each row using comma separation.

Figure 3B:
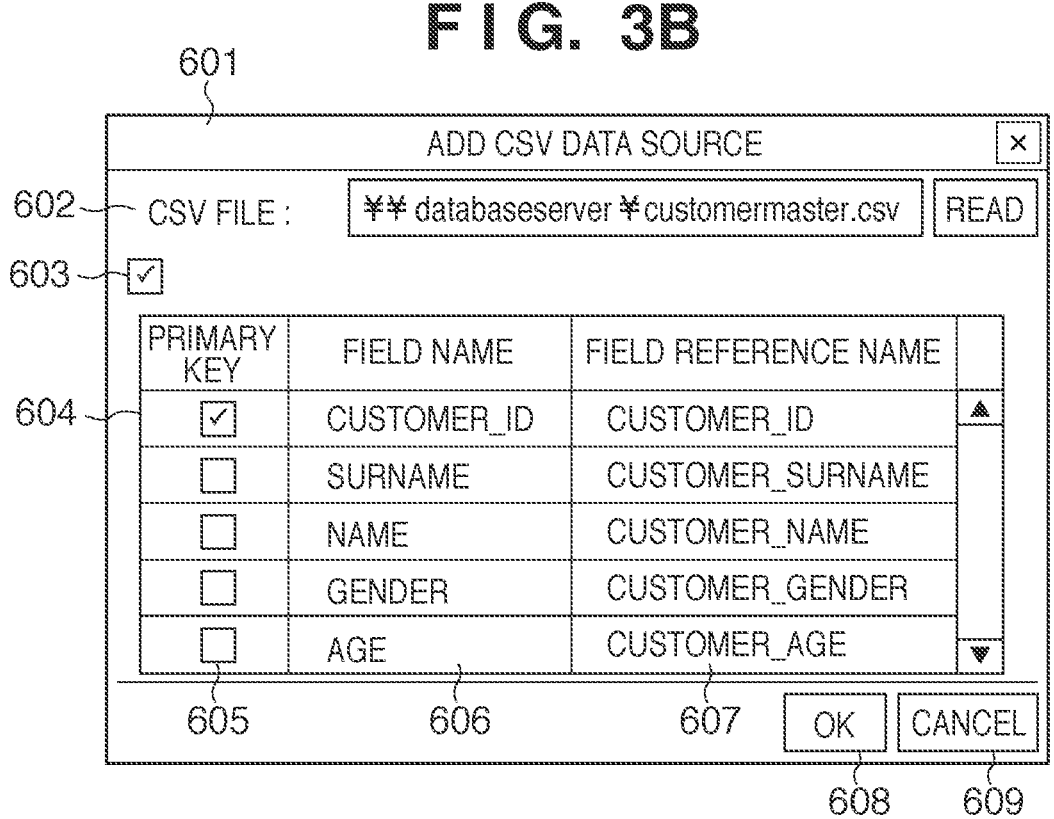

FIG. 3B shows an example of an editing result in the case of designating the CSV file shown in FIG. 4A via the CSV data source addition screen shown in FIG. 3A. The UNC notation path of the CSV file shown in FIG. 4A is designated in a text input field 602. If the read button is operated in this state, the VDP program reads the designated CSV file. If a check mark is put in a check box 603, the field names separated by commas are obtained from the first row of the designated CSV file, and displayed in an area 606. Here, since a check mark is put in the check box 603, "customer ID", "surname", "name", "gender", and "age" in the first row of the CSV file shown in FIG. 4A are respectively displayed as field names in the area 606. The VDP program accepts an input from the user, and receives designation of a primary key in an area 605, and designation of field reference names in an area 607. Here, it is assumed that the customer ID field is designated as the primary key, and field reference names, namely "customer_ID", "customer_surname", "customer_name", "customer_gender", and "customer_age", are respectively designated with respect to the "customer ID", "surname", "name", "gender", and "age" fields. Here, if an OK button 608 is operated, the VDP program ends the CSV data source addition screen.

Figure 2B:
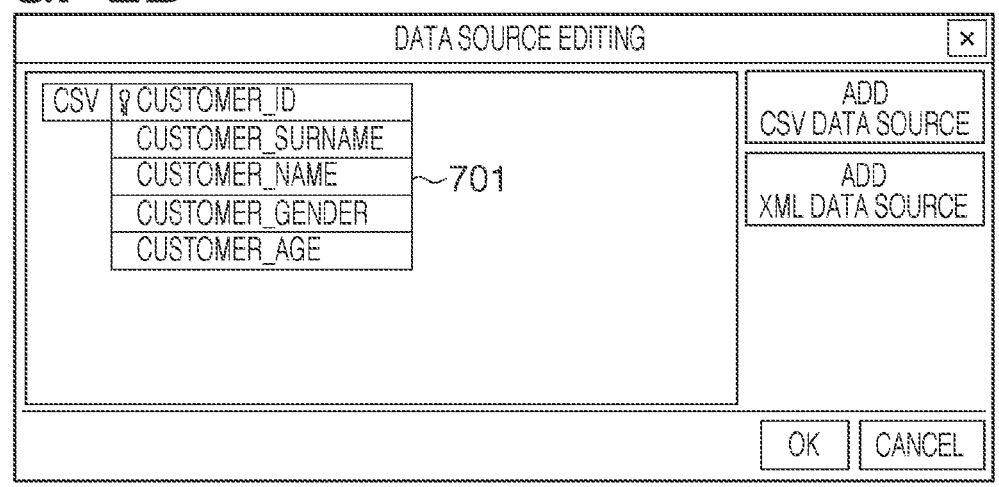

FIG. 2B is a diagram showing an example of display in the case where the CSV data source edited as shown in FIG. 3B is added to the data source editing screen. An object 701 indicates the added CSV data source. The VDP program displays the field reference names designated in the area 607. Further, a key icon is displayed in the field designated as being the primary key in the area 605.

Although a UNC notation path is designated in the embodiment of the present invention, the present invention is not limited to this, and for example, a description format such as a URL (Uniform Resource Locator) or a URI (Uniform Resource Identifier) may be used. Further, a row other than the first row of a CSV file may be used for designation of field names, and another method, for example, a method of designating field names from another file, may be used.

XML Data Source Addition

Figure 5A:
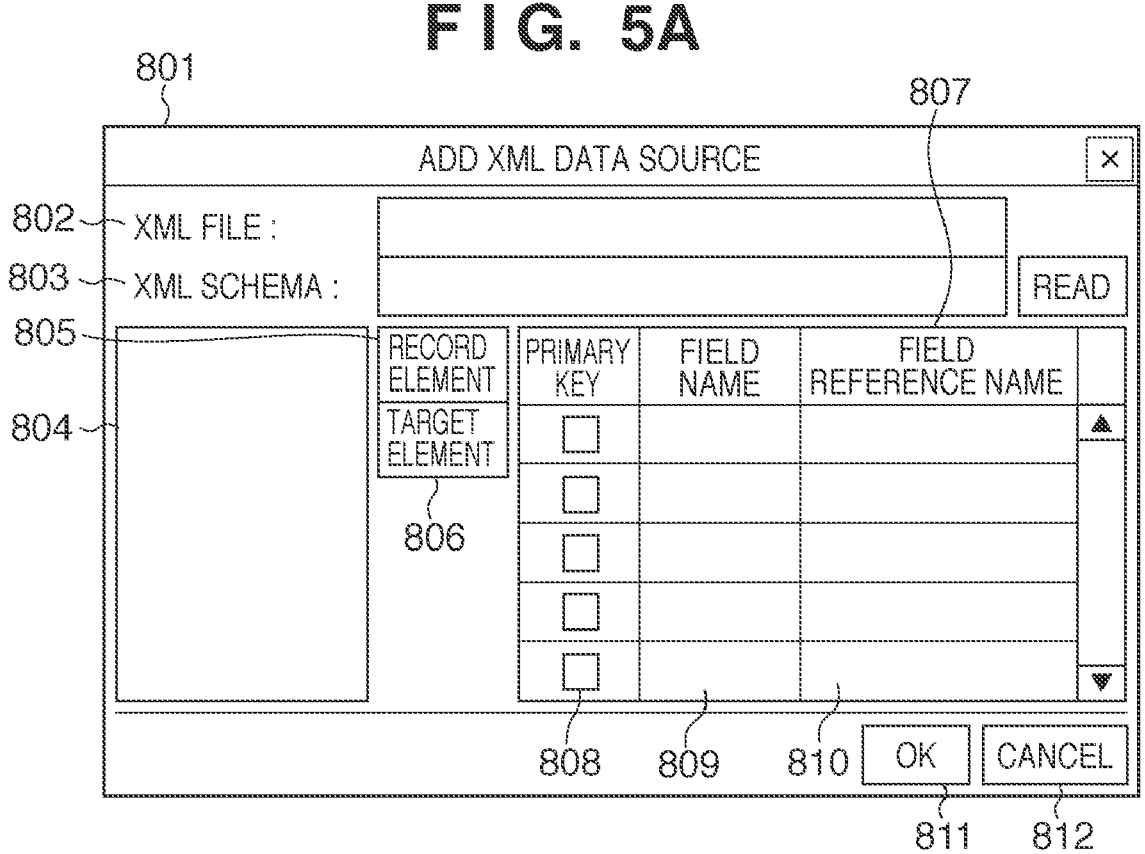
FIGS. 5A and 5B are diagrams showing examples of an XML data source addition screen according to the embodiment of the present invention.

A description will now be given regarding operation of the VDP program if the XML data source addition button 304 is operated, with reference to FIGS. 4A to 7. FIG. 5A shows an XML data source addition screen displayed, on the display 205, by the VDP program in the client PC 103 according to the present embodiment if the XML data source addition button 304 is operated. A dialog box 801 is an interface for adding an XML data source. A text input field 802 is for the user to designate an XML file. A text input field and a read button 803 are for the user to designate an XML schema file. In a schema display area 804, the structure of the XML schema file designated using the text input field and read button 803 is displayed. A record element button 805 is for the user to designate an element to be the record level from the structure of the XML schema file displayed in the schema display area 804. Here, the record level element is used as a unit for repetition when performing VIP print with the application of an XML data source, and has a record unit structure. A target element button 806 is for the user to designate an element to be used as a data source from the structure of the XML schema file displayed in the schema display area 804. A field management area 807 has an area 809 for displaying a field name of the element designated via the target element button 806, an area 808 for the user to designate the primary key, and an area 810 for the user to designate a field reference name. An OK button 811 is for saving XML data source addition content, and ending the processing. A cancel button 812 is for discarding XML data source addition content, and ending the processing.

FIG. 4B is a diagram showing content of an XML schema file used in a first embodiment. The XML schema file is stored in the external storage device 204 of the database server 102, and can be accessed using the UNC notation path, "¥¥databaseserver¥order.xsd". The root element is "orders", and appears only one time. The child element of the "orders" element is "order". The "order" element can appear unlimited times. The child elements of the "order" element are "customer_id", "address", and "customer_order". The "customer_id" and "address" elements appear one time each in this stated order. Also, the "customer_order" element appears only one time. The child elements of the "address" element are "zip", "prefecture", "city", "street", and "tel", and appear one time each in this stated order. The child elements of the "customer_order" element are "product_name" and "order_date", and appear one time each in this stated order. Note that although the XML schema is used in the embodiment of the present invention, the present invention is not limited to this, and an arbitrary schema can be used, as long as the schema can represent the structure of markup language data, such as DTD (Document Type Definition), or Relax, for example.

Figure 5B:
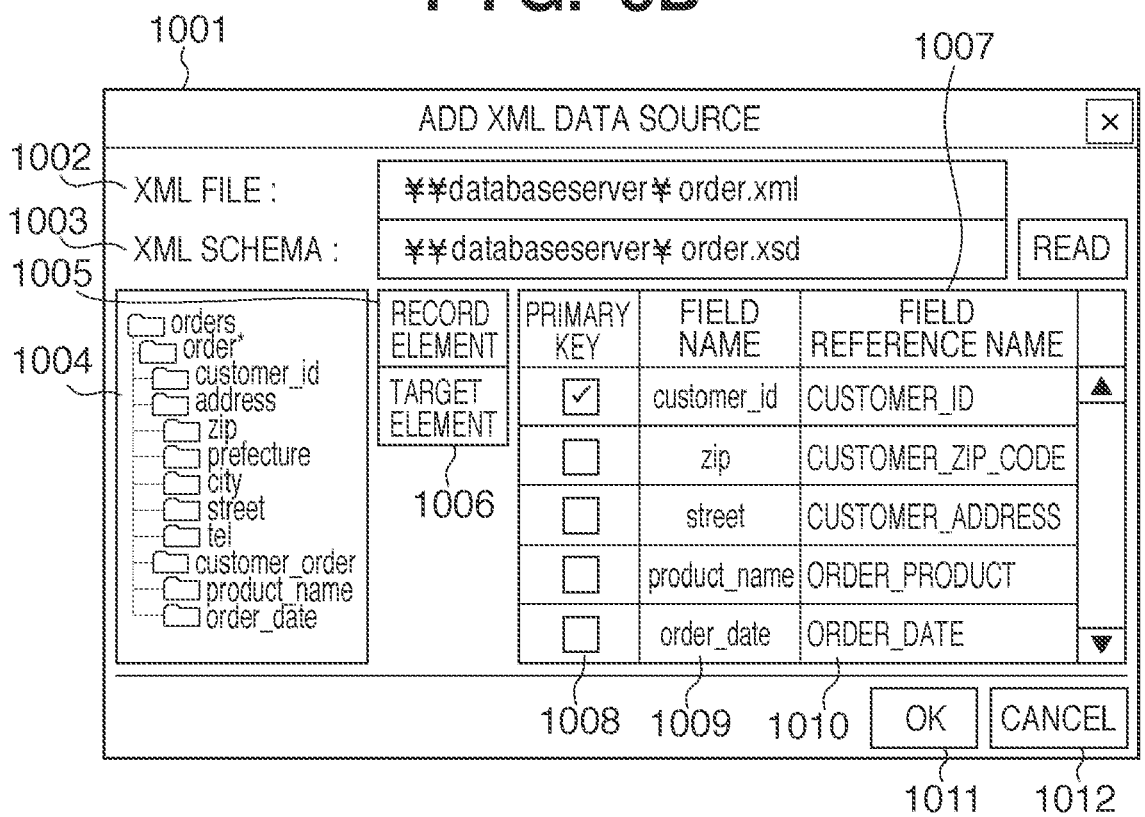

FIG. 5B is a diagram showing an example of an editing result in the case where the XML schema file shown in FIG. 4B is designated via the XML data source addition screen shown in FIG. 5A. A UNC notation path of an XML file shown in FIG. 11A is designated in a text input field 1002. The UNC notation path of the XML schema file shown in FIG. 4B is designated in a text input field 1003.

Reading Flow

Figure 6:
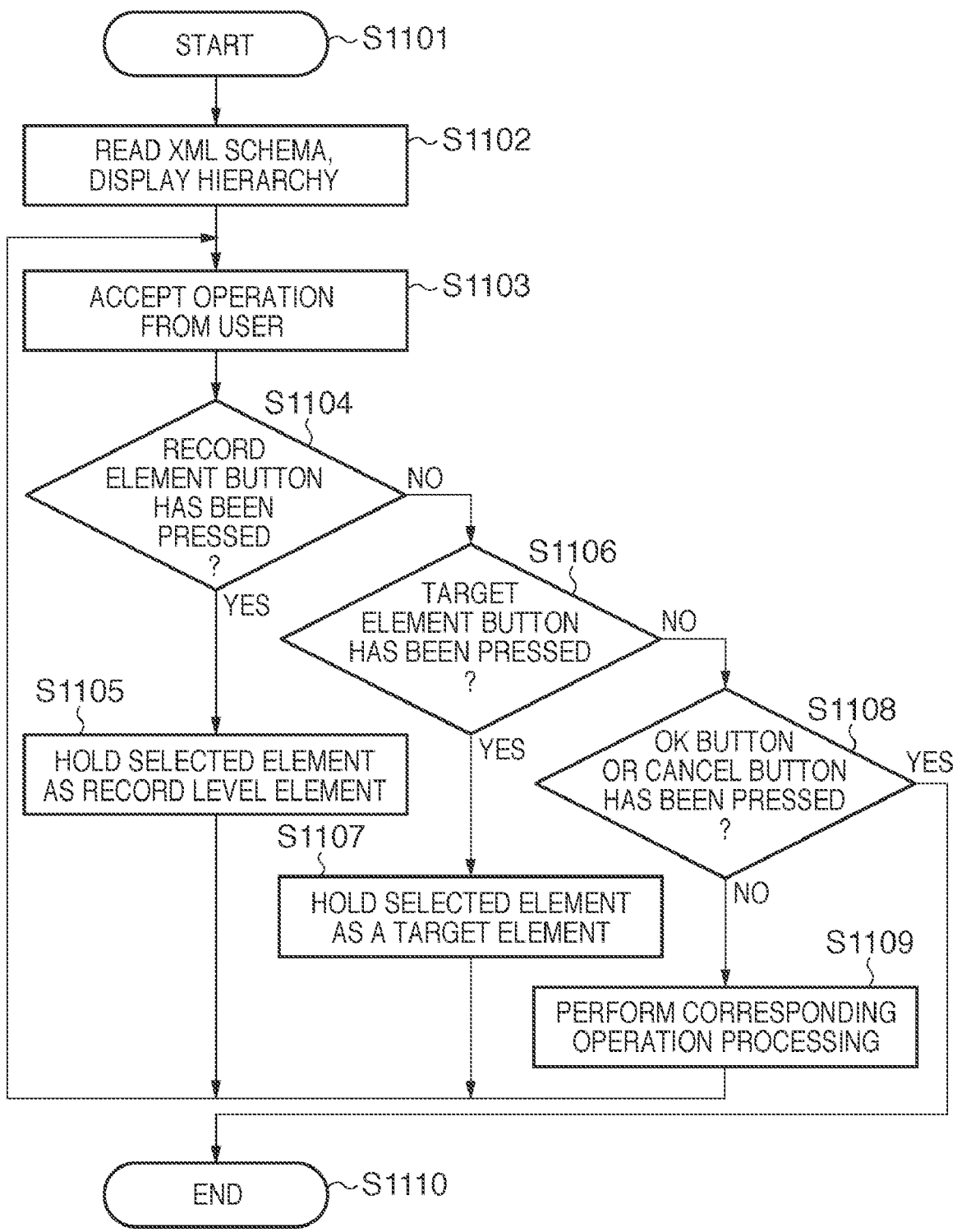
FIG. 6 is a flowchart showing processing performed after a read button has been operated via the XML data source addition screen according to the embodiment of the present invention.

Processing after a read button is operated in this state will now be described with reference to the flowchart shown in FIG. 6. FIG. 6 is a flowchart showing processing of the VDP program after the read button is operated. The VDP program stored in the external storage device 204, for instance, is read to the RAM 202, and is executed by the CPU 201. In S1101, processing starts. In S1102, the VDP program reads the designated XML schema file, and displays the structure of the XML schema in a schema display area 1004 shown in FIG. 5B. This realizes a markup language data structure display means. Note that here, the hierarchical structure and element names in accordance with the XML schema shown in FIG. 4B are displayed as a display example. Although a description of the procedure for interpreting the XML schema and displaying the hierarchical structure thereof is omitted since it is known, a method for displaying elements is later described with reference to FIG. 7. In S1103, the VDP program accepts a user operation. Processing in S1104 is for determining whether or not the operation accepted in S1103 was made by pressing a record element button 1005. If the record element button has been pressed (YES in S1104), the processing proceeds to S1105. If the record element button 1005 was not pressed (NO in S1104), the processing proceeds to S1106. In S1105, the element selected in the schema display area 1004 is held as the record level element. After that, the processing returns to S1103. Note that a record level element designation acceptance unit is realized by designating a record level element when the user operation is accepted in S1103, and holding it in S1105.

Processing in S1106 is for determining whether or not the operation accepted in S1103 was made by pressing a target element button 1006. If the target element button has been pressed (YES in S1106), the processing proceeds to S1107. If the operation from the user was not made by pressing the target element button 1006 (NO in S1106), the processing proceeds to S1108. In S1107, the element selected in the schema display area 1004 is held as a target element, and added to a field management area 1007. A target element acceptance means is realized by the user operation in S1103 and the target element being held in S1107. After that, the processing returns to S1103. Processing in S1108 is for determining whether or not the operation accepted in S1103 was made by pressing either an OK button 1011 or a cancel button 1012. If either the OK button 1011 or the cancel button 1012 has been pressed (YES in S1108), the processing proceeds to S1110. In the case other than that (NO in S1108), the processing proceeds to S1109. In S1109, processing is performed in accordance with the other input. After that, the processing returns to S1103. In S1110, the processing ends.

Schema Element Display Flow

FIG. 7 is a flowchart showing processing performed when the VDP program displays elements of an XML schema in the schema display area 1004. In S1201, processing starts. Processing in S1202 is for determining whether or not the record level element has already been designated. If the record level element has been designated (YES in S1202), the processing proceeds to S1206. If the record level element has not been designated yet (NO in S1202), the processing proceeds to S1203. Processing in S1203 is for determining whether or not the element can be repeated. In the present embodiment, it is assumed that an element that can be repeated cannot not be a target element. As a criterion for this determination, if a "maxOccurs" attribute is designated to elements, and a value of two or more or "unbounded" is designated as that value, it is determined that the element can be repeated. If the element can be repeated (YES in S1203), the processing proceeds to S1204. If the element cannot be repeated (NO in S1203), the processing proceeds to S1205. Processing in S1204 is for emphatically displaying candidates for the record level element. This realizes a record level candidate display means. In the example shown in FIG. 5B, "*" is added and displayed to the right of the "order" element. After that, the processing proceeds to S1209. Processing in S1205 is for normally displaying elements. After that, the processing proceeds to S1209.

Processing in S1206 is for determining whether or not an element is a descendant element of the record level element. If it is a descendant element of the record level element (YES in S1206), the processing proceeds to S1207. If it is not a descendant element of the record level element (NO in S1206), the processing proceeds to S1208. Processing in S1207 is for determining whether or not the element can be repeated. In the present embodiment, if the "maxOccurs" attribute is designated to elements, and a value of two or more or "unbounded" is designated as that value, it is determined that the element can be repeated. If the element can be repeated (YES in S1207), the processing proceeds to S1208. If the element cannot be repeated (NO in S1207), the processing proceeds to S1205. Processing in S1208 is for preventing the user from selecting the element by displaying it in a dimmed manner, in the case where the record level element has been designated, and the element is not a descendant element of the record level, or in the case where the record level element has been designated, the element is a descendant element of the record level, and the element cannot be used as a data source since it can be repeated. This realizes an excluded element display means. After that, the processing proceeds to S1209. In S1209, the processing ends.

Note that both the record level candidate display unit and the excluded element display unit may be provided, or either one of the units may be provided.

Processing Result

Through the above processing, if a record level element is selected in the schema display area 1004, and the record element button 1005 is operated (pressed), the VDP program determines the element as being the record level element. Here, it is assumed that "order" has been designated. Further, in the state where the record level element has been designated, if an element that is descendant of the record level element is selected in the schema display area 1004, and the target element button 1006 is operated, the VDP program determines the element as being an element to be used as a data source, and adds the element to the field management area 1007. Here, it is assumed that "customer_id", "zip", "street", "product_name", and "order_date" have been designated. The VDP program displays the element names of the designated elements in an area 1009. The VDP program accepts a user input, and receives designation of the primary key in an area 1008, and designation of field reference names in an area 1010. Here, it is assumed that the customer ID field is designated as the primary key, and the field reference names, namely "customer_ID", "customer_zip_code", "customer_address", "order_product", and "order_date" have been respectively designated by the user with respect to the "customer_id", "zip", "street", "product_name", and "order_date" fields. Here, if the OK button 1011 is operated, the VDP program ends the XML data source addition screen.

Figure 2C:
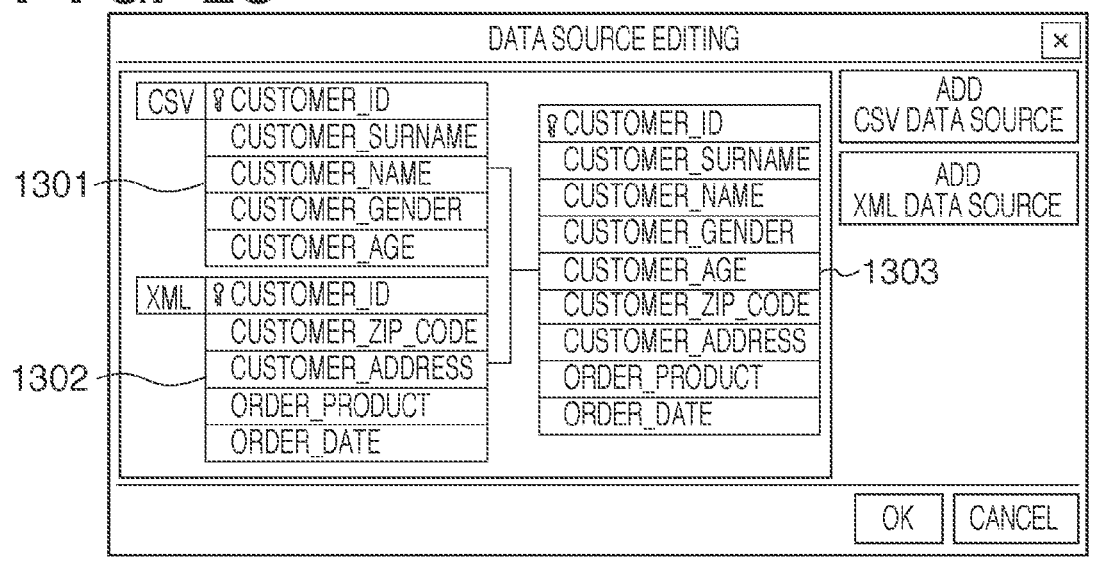

FIG. 2C shows an example of display if the XML data source edited as shown in FIG. 5B has been added to the data source editing screen shown in FIG. 2B. An XML data source 1302 indicates the added XML data source. The VDP program displays the field reference names designated in the area 1010. Further, a key icon is displayed in the field designated as the primary key in the area 1008. Here, the VDP program can accept an instruction to combine the added data sources from the user. Here, assuming that an instruction to combine a CSV data source 1301 and the XML data source 1302 has been issued, the combined data source is displayed as a combined data source 1303. Combination is performed using the primary keys of both of the data sources. For the combined data source, a union of the fields of the data sources, which are the combination targets, is used.

Note that although emphasis display is performed by adding "k" to the right of an element name displayed in the schema display area 1004 in the present embodiment, the present invention is not limited to this, and the element name may be displayed in boldface or the display color of the element name may be changed. Further, although an element is displayed in a dimmed manner to prevent the user from selecting it in the present embodiment, the present invention is not limited to this, and the element name itself may not be displayed.

VDP Document Editing

Figure 8A:
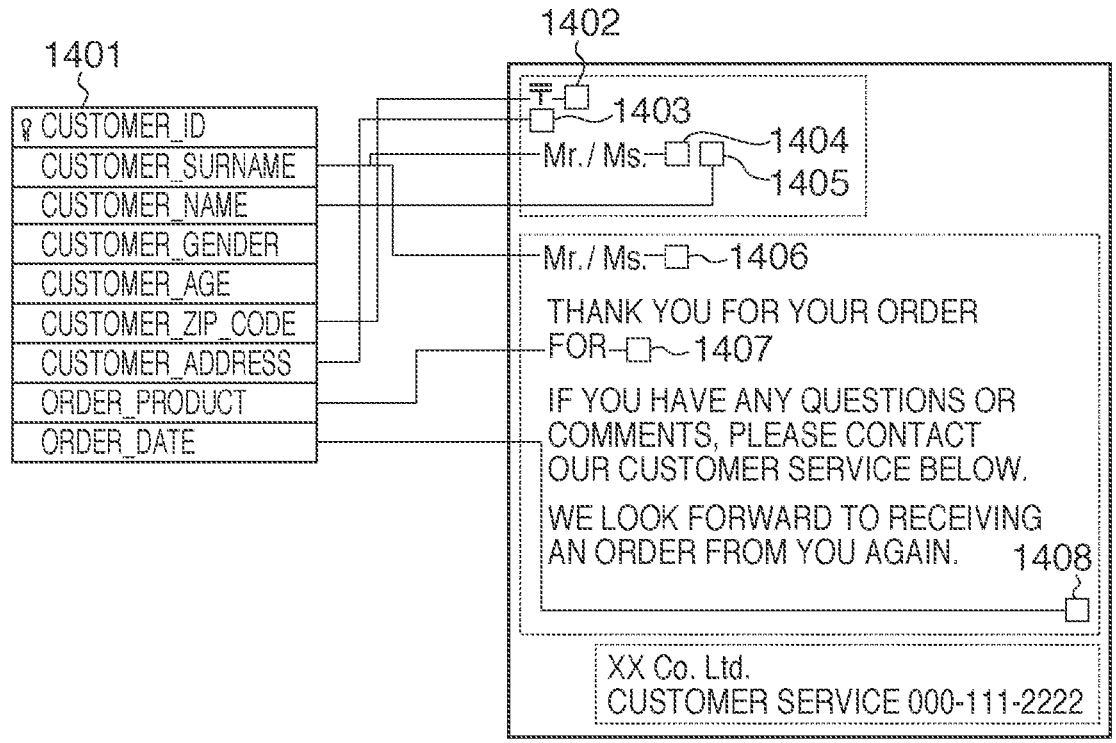
FIGS. 8A and 8B are diagrams showing examples of a VDP document editing screen according to the embodiment of the present invention.

Next is a description of a VDP document editing screen shown in FIG. 8A. The VDP program in the client PC 103 according to the present embodiment accepts various editing operations from the user, and displays the results thereof on the display 205. Here, FIG. 8A shows the result of having accepted an operation for associating variable portions in input character strings with a data source. The combined data source shown in FIG. 2C is displayed as a data source 1401. A variable portion 1402 is associated with the "customer_zip_code" field of the data source 1401. Likewise, variable portions 1403 to 1408 are respectively associated with the "customer_address", "customer_surname", "customer_name", "customer_surname", "order_product", and "order_date" fields of the data source 1401.

Note that although character strings include variable portions in the present embodiment, the present invention is not limited to this, and as long as a component is an editing target, such as an image, a graphic, or a layer, it is possible to associate any of these with a data source as a variable portion. Further, an association rule may be set using a GUI, a script, or the like for when performing association.

VDP Document Printing

Next is a description of operation of the VDP program where an instruction is issued to print the VDP document shown in FIG. 8A, with reference to FIGS. 8A to 12. FIG. 9 is a flowchart showing processing performed when the VDP program accepts an instruction to print a VDP document in the present embodiment. In S1501, processing starts. In S1502, processing is performed in which the VDP program determines whether or not data sources are combined. If they are combined (YES in S1502), the processing proceeds to S1504. If they are not combined (NO in S1502), the processing proceeds to S1503. Since the VDP document shown in FIG. 8A uses the combined data source 1303 shown in FIG. 2C, the processing proceeds to S1504. In S1503, processing is performed in which the VDP program reads data from a data source and creates a table.

In S1504, processing is performed in which the VDP program reads data from the data sources, and creates tables if the data sources are combined. A table 1901 in FIG. 12 shows the data structure of a table that is held in the RAM 202 when the VDP program reads data of the CSV data source 1301. A table 1907 in FIG. 12 shows the data structure of a table that is held in the RAM 202 when the VDP program reads data of the XML data source 1302. It should be noted that the method for creating the table 1901 from "¥¥databaseserver¥customermaster.csv" (FIG. 4A) designated as a CSV file for the CSV data source 1301 is known, and thus a description thereof is omitted. Processing for creating the table 1907 from the XML data source 1302 is described later with reference to FIG. 10. FIG. 11A shows the content of "¥¥databaseserver¥order.xml" designated as XML data for the XML data source 1302.

In S1505, processing is performed in which the VDP program combines the tables created in S1504. A table 1913 in FIG. 12 shows the data structure of the table that the VDP program holds in the RAM 202 in order to hold data of the combined data source 1303. Data of the table 1913 is created from the tables 1901 and 1907 obtained by reading data of the CSV data source 1301 and data of the XML data source 1302. Here, since the primary key of the CSV data source 1301 is "customer_ID", and the primary key of the XML data source 1302 is also "customer_ID", the table 1913 is obtained by combining the tables 1901 and 1907, using "customer_ID" as the primary key. This realizes a multiple internal data combining means. In S1506, processing is performed in which the VDP program creates VDP print data by applying data of the created table to a VDP document one record at a time. Subsequently, in S1507, processing is performed in which the VDP program transmits the created VDP print data to the POD printing apparatus 104 via the network 101. In S1508, the processing ends.

Data Structure Conversion Flow

Figure 10:
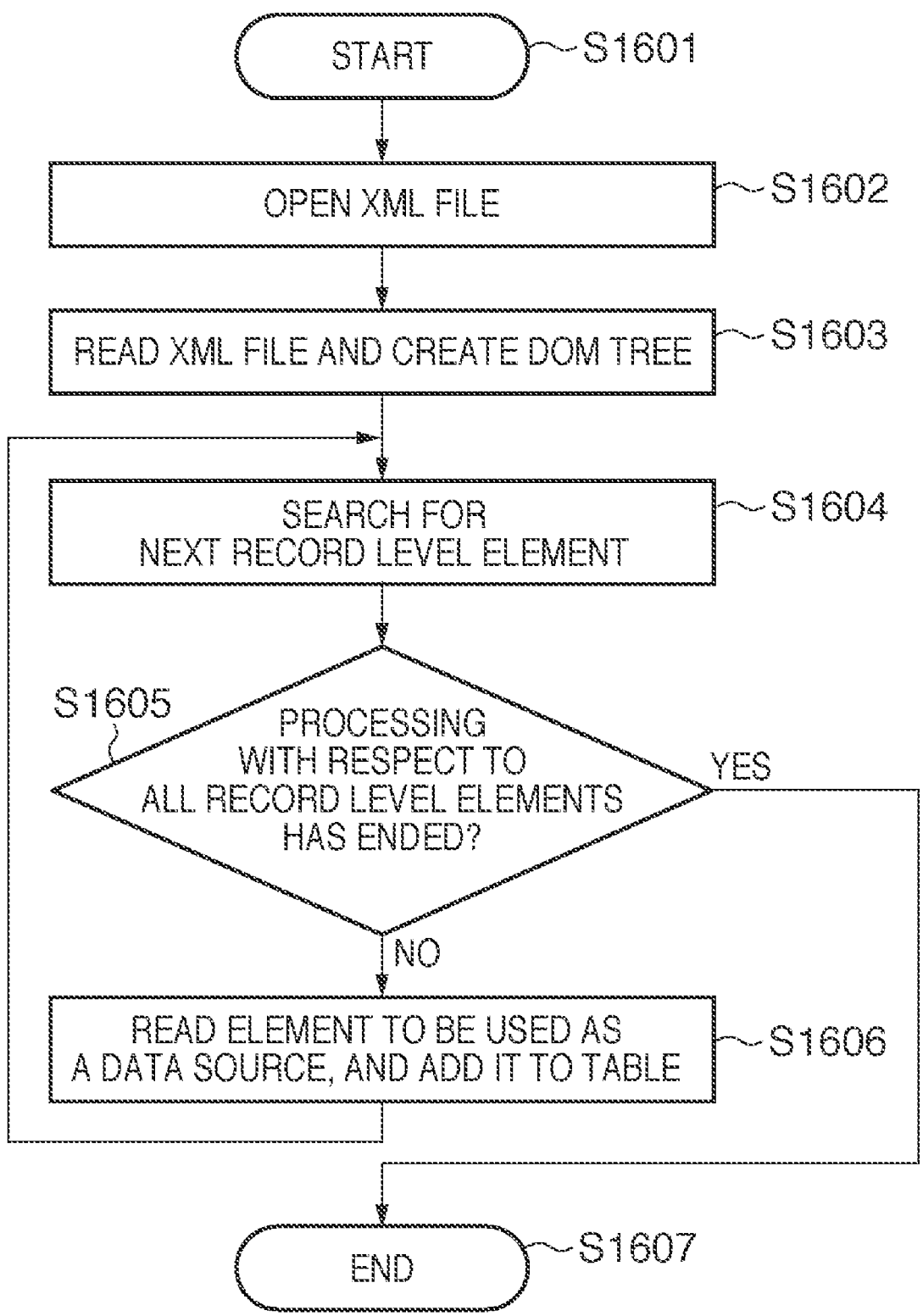
FIG. 10 is a flowchart showing processing for converting XML data so as to have an internal data structure at the time of VDP document printing according to the embodiment of the present invention.
Figure 11B:
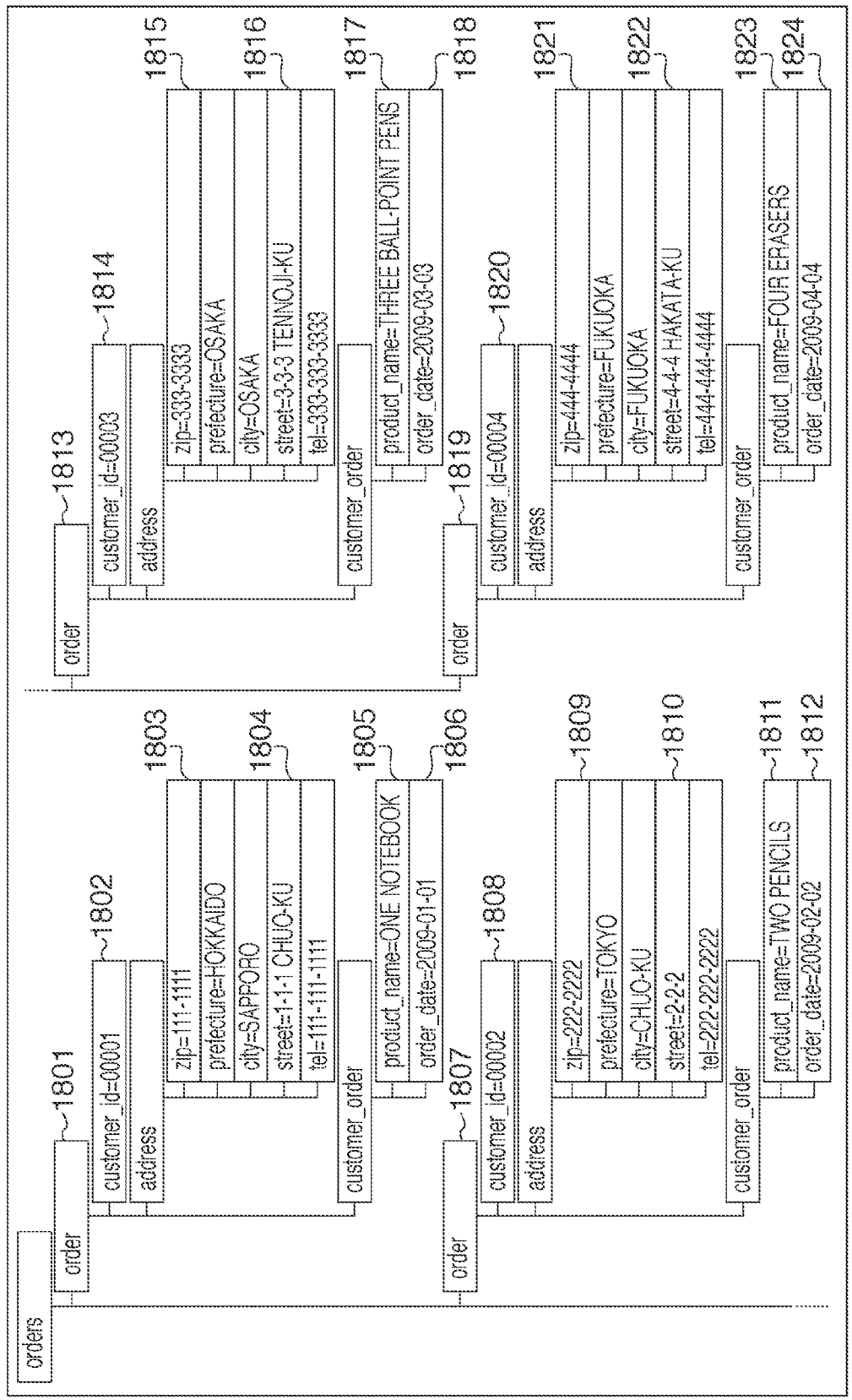

FIG. 10 is a flowchart showing processing in which upon accepting an instruction to print a VDP document in the present embodiment, the VDP program reads an XML file designated as an input of an XML data source, and converts the read XML file so as to have a table internal data structure. In S1601, processing starts. In S1602, the VDP program opens an XML file designated as XML data for a data source. Here, the XML file shown in FIG. 11A is opened. In S1603, the VDP program reads content of the opened XML file, and creates a DOM (Document Object Model) tree in the RAM 202. The method for creating a DOM tree from XML data is known, and thus a description thereof is omitted. The created DOM tree is shown in FIG. 11B. Examples of correspondence between the XML data shown in FIG. 11A and the DOM tree shown in FIG. 11B are shown by 1801 to 1806 in FIGS. 11A and 11B. Here, the descendants of "orders" serving as the root element are "order" serving as the record level element having a record unit structure. In S1604, the VDP program searches for the next record level element from the created DOM tree. Here, since "order" is the record level element, a node 1801 is found. Processing in S1605 is for determining whether or not processing with respect to all the record level elements has ended. If a next record level element is not found in S1604 (YES in S1605), the processing proceeds to S1607. If the record level element is found (NO in S1605), the processing proceeds to S1606. Processing in S1606 is for adding an element to be used from among descendant elements of the record level element found in S1604, as a data source to the table 1907. A markup language data structure conversion unit is realized by, in S1606, adding data to a table, and converting the format thereof so that it can be utilized as a data source. After the processing ends, the processing returns to S1604. Here, "customer_id", "zip", "street", "product_name", and "order_date" are the target elements. Further, the field reference names, namely "customer_ID", "customer_zip_code", "customer_address", "order_product", and "order_date", are respectively defined with respect to the elements. Accordingly, the VDP program adds a row 1909 to the table 1907 based on the values of the nodes 1802 to 1806.

Likewise, by again executing the processing in S1604, a node 1807 is found, and the VDP program adds a row 1910 to the table 1907 based on the values of nodes 1808 to 1812. Likewise, by again executing the processing in S1604, a node 1813 is found, and the VDP program adds a row 1911 to the table 1907 based on the values of nodes 1814 to 1818. Likewise, by again executing the processing in S1604, a node 1819 is found, and the VDP program adds a row 1912 to the table 1907 based on the values of nodes 1820 to 1824. This completes processing with respect to all the record level elements, and thus the processing proceeds from S1605 to S1607. In S1607, the processing ends.

Figure 8B:
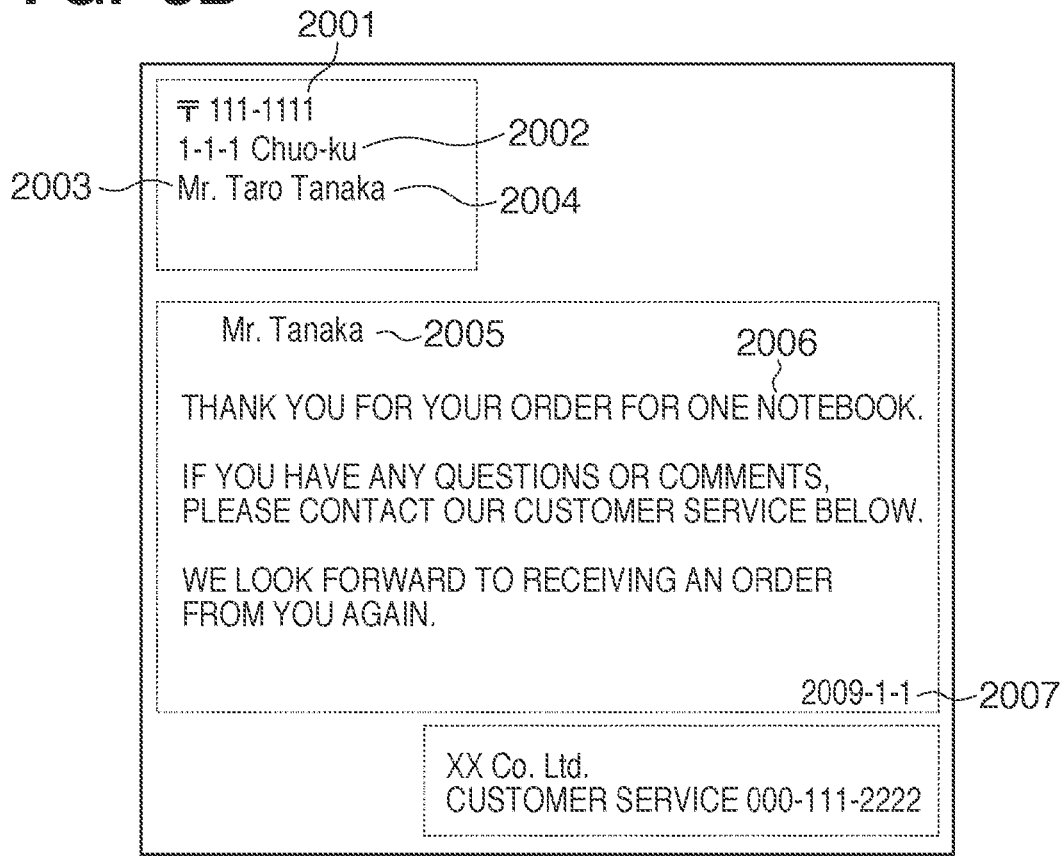

FIG. 8B shows an example of a result obtained by applying the first record 1915 of the combined data source 1303 to the VDP document shown in FIG. 8A. As shown in FIG. 8A, the fields of the combined data source are associated with the variable regions. As a result of replacing the variable portions 1402 to 1408 shown in FIG. 8A with the values of the fields of the record 1915, variable regions 2001 to 2007 shown in FIG. 8B are obtained. Records 1916 to 1918 can also be applied in the same manner.

Although processing is performed in which a DOM tree is created from XML data in the present embodiment, there is no limitation to this, and processing can also be performed using SAX (Simple API for XML) or another interface. Further, although data of each data source is once read into a table data structure, and then such data pieces are combined, there is no limitation to this. For example, records may be read from each data source one by one, and may be sequentially combined. Further, if data sources are managed under the same database program, it is also possible to combine data pieces on a database server by, for example, issuing an SQL (Structured Query Language) statement, and thereafter obtain the combined data.

Through the above processing, according to the present invention, even in the case of XML data that does not have a two-dimensional structure (also including data obtained from an XML file or an XML database), it is possible to apply such data as a data source of a VDP document. Further, it is also possible to combine data obtained from another data source (RDB or CSV) with XML data, and apply the combined data to a VDP document. Further, a candidate element can be emphatically displayed when designating the record level element, and thus user recognizability can be enhanced, and the user can efficiently perform operations. Further, an element that cannot be used can be excluded from the display in advance when designating a target element, and thus user operability can be improved, and the user can efficiently perform operations. Further, no matter how complicated the structure of XML data is, since only an element to be used is designated in advance, the efficiency of the operation when associating data with a VDP document is increased. This enables using XML data that does not have a two-dimensional structure as a data source for generating a VDP document, and thus the versatility of data used as a data source improves. Further, in regard of the recognizability and operability with respect to elements of a data source as well, user convenience can be improved.

Second Embodiment

It is described in the first embodiment that even an XML data source can be applied to a VDP document, and combined with another data source, by accepting designation of the record level element and a target element that is a descendant element of the record level element to be used. However, it is not possible to designate, as a target element, an element that can be repeated from among descendant elements of the record level element, and thus such an element is not the target for designation, as an excluded element. In view of this, the ability to also designate a descendant element that can be repeated is realized.

FIG. 13 is a flowchart showing processing in which the VDP program displays elements of an XML schema in the schema display area 1004 in a second embodiment. This flowchart is used instead of the flowchart shown in FIG. 7 for performing similar processing in the first embodiment. S2101 to S2107 are the same as S1201 to S1207 in FIG. 7. It should be noted that if it is determined in S2107 that an element cannot be repeated (NO in S2107), the processing proceeds to S2108, and if an element can be repeated (YES in S2107), the processing proceeds to S2109. Processing in S2108 is not for adding the element name of an element to the schema display area 1004, but for adding "parent element name/" (this means the element name of a parent element, not the character string "parent element name") before an element name, and thereafter adding the result to the schema display area 1004. The processing proceeds to S2105, where normal display is performed. Processing in S2109 is for determining whether or not repetition is to be performed limited times if the element can be repeated. In the present embodiment, if the "maxOccurs" attribute is designated to elements, and a numerical value of one or more, not "unbounded", is designated as that value, it is determined that repetition is to be performed limited times. In the case of limited repeating (YES in S2109), the processing proceeds to S2110. In the case of unlimited repeating (NO in S2109), the processing proceeds to S2111. Processing in S2110 is for adding n elements to which "parent element name/" has been added before their element names, and "_1" to "_n" (n denotes the number of times that repetition is possible) have been respectively added after their element names, to the schema display area 1004. This processing realizes a limited repeating element display unit. After that, the processing proceeds to S2105, and normal display is performed. S2111 and S2112 are the same as S1208 and S1209 in FIG. 7.

Figure 14:
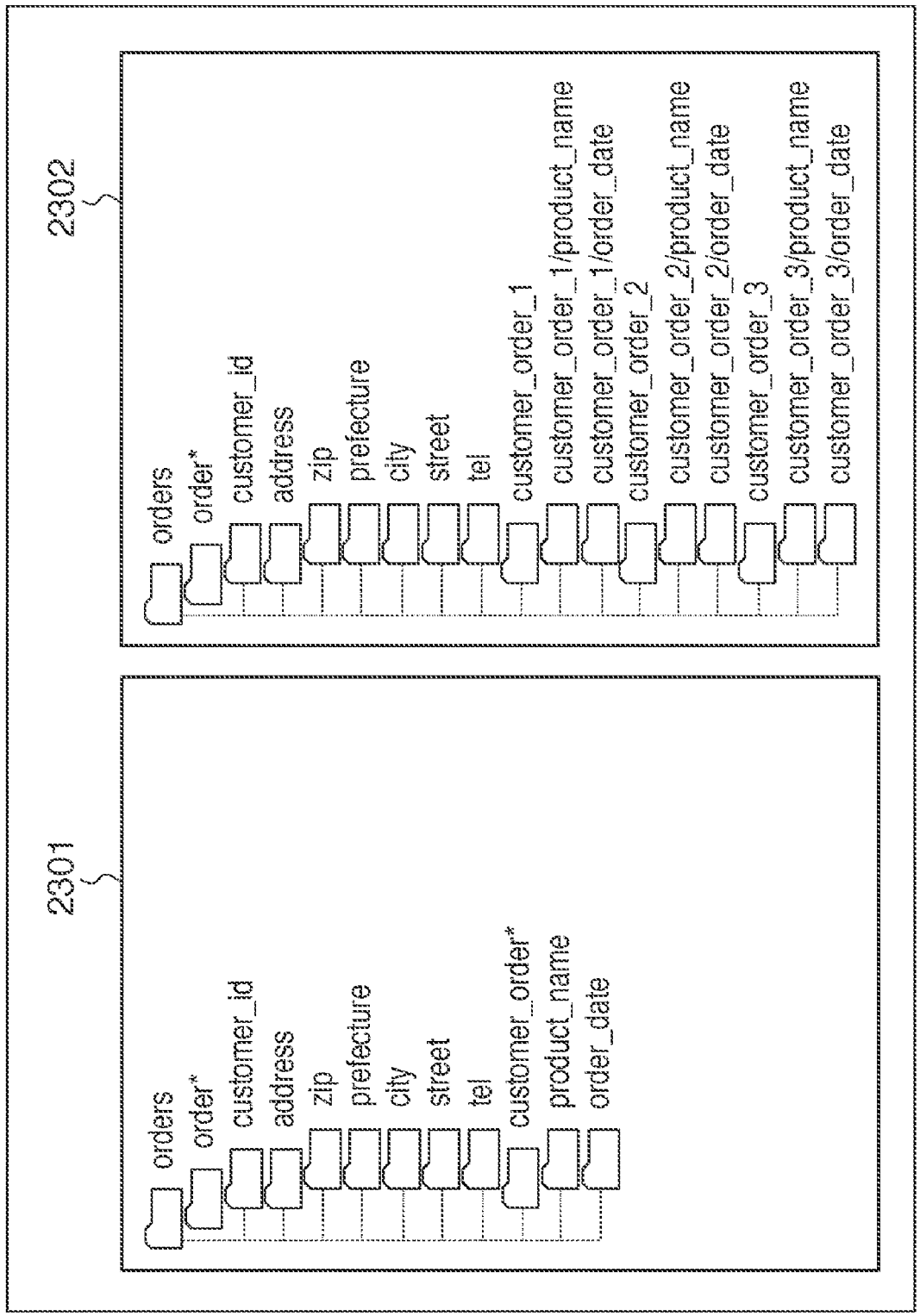
FIG. 14 is a diagram showing an example of an XML schema display area according to the second embodiment.

In the description of an XML schema file, the "maxOccurs" attribute of the "customer_order" element can define that this element can appear multiple times. Therefore, for example, if the value "3" is designated as the "maxOccurs" attribute of the "customer_order" element in the 21st row in FIG. 4B (maxOccurs=3), this indicates that this element can appear a maximum of three times. FIG. 14 is a diagram showing an example of a display result of an XML schema file in which 3 is set as the "maxOccurs" attribute of the "customer_order" element. A display result 2301 shown in FIG. 14 is a display result before designating the record level element, and a display result 2302 is a display result after designating "order" as the record level element. In the display result 2301, since "order" and "customer_order" elements can be repeated, emphasis display is performed in accordance with processing in S2103 and S2104. In the example in FIG. 14, emphasis display is performed by adding "*" to the right of the elements. In the display result 2302, the "customer_order" element is a descendant element of the record level element, and can be repeated. Accordingly, three elements to which "_1" to "_3" have been added at the end of the element name (here customer_order) are displayed in accordance with processing in S2106 to S2109.

Through the above processing, even an element that can be repeated can be designated as a target element from among descendant elements of the record level element. Thereby, in addition to the effects of the first embodiment, XML elements that can be repeated are expanded in advance, and displayed, and thus the elements can be associated with a VDP document as individual elements.

Third Embodiment

It is described in the second embodiment that elements for which the number of times that repetition is possible is limited can be designated as a target element from among descendant elements that can be repeated of the record level element. However, elements for which the number of times that repetition is possible is unlimited cannot be designated as a target element, and thus such elements are not the target for designation, as an excluded element. In a third embodiment, even if the number of times that repetition is possible is unlimited, use of an element is not restricted, and such elements can be used by controlling the number of times that repetition is possible.

Figure 15:
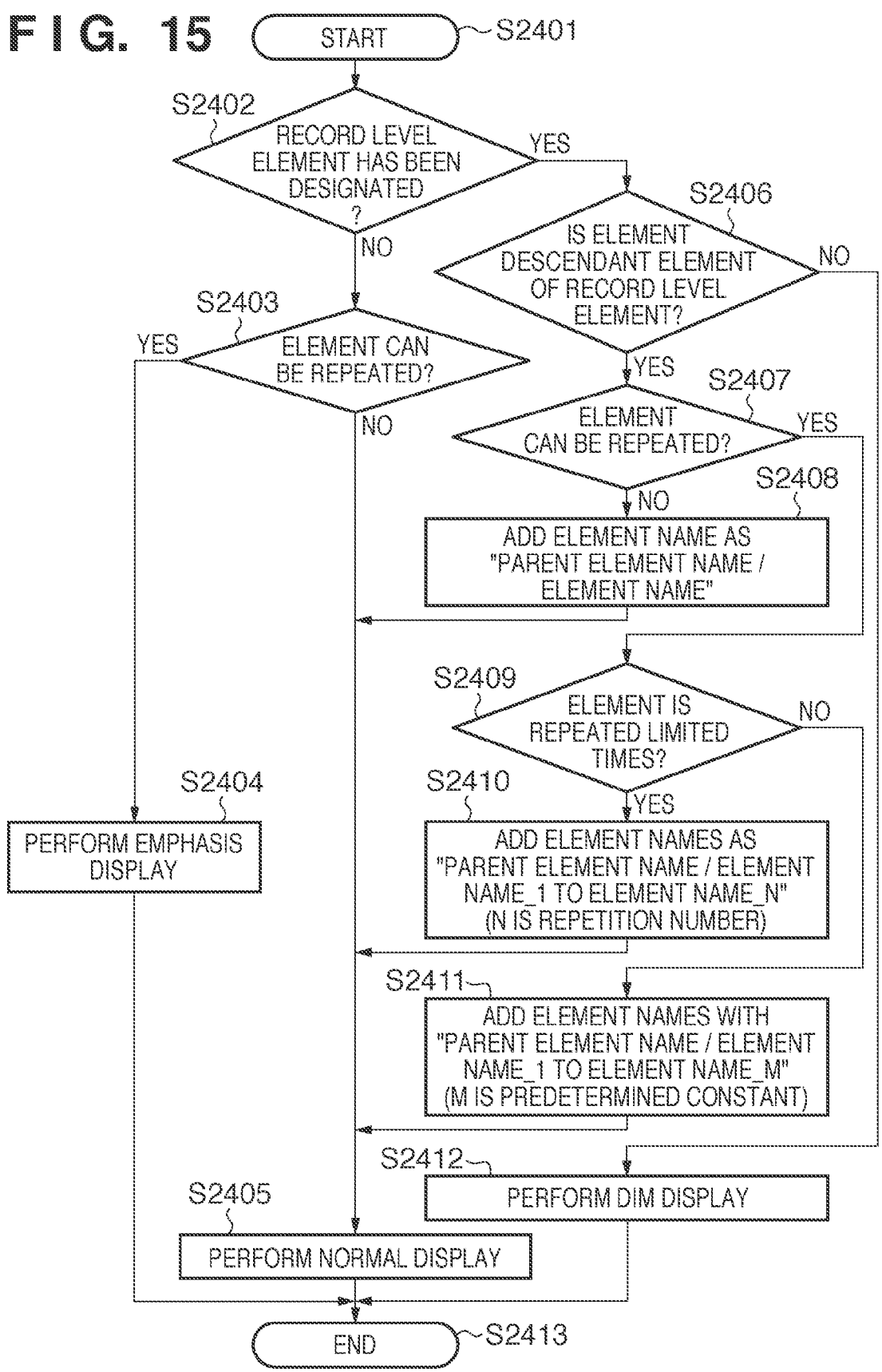
FIG. 15 is a flowchart showing processing according to a third embodiment.

FIG. 15 is a flowchart showing processing in which the VDP program displays elements of an XML schema in the schema display area 1004 in the third embodiment. This flowchart is used instead of the flowchart shown in FIG. 7 for performing similar processing in the first embodiment and the flowchart shown in FIG. 13 in the second embodiment. S2401 to S2410 are the same as S2101 to S2110 shown in FIG. 13. Note that if it is determined in S2409 that repetition is performed unlimited times, the processing proceeds to S2411. Processing in S2411 is for adding, if an element can be repeated unlimited times, "parent element name/" (this means the element name of a parent element, not the character string "parent element name") before the element name. Then, m elements to which "_1" to "_m" (m is a predetermined number of times) are respectively added after the element names are added to the schema display area 1004. In this way, even if an element can be repeated unlimited times, such an element can be used as a target element after causing it to be an element that is repeated only the predetermined number of times (for example, 5 times). This processing realizes an unlimited repeating element display unit. The processing proceeds to S2405, and normal display is performed. S2412 and S2413 are the same as S2111 and S2112 in FIG. 13.

In the third embodiment, in contrast to the second embodiment, in the description of an XML schema file, the value "unbounded", which indicates that this element can appear unlimited times, is designated as the "maxOccurs" attribute of the "customer_order" element. Here, the "customer_order" element is a descendant element of the record level element, and can be repeated unlimited times, and thus in accordance with processing in S2406, S2407, S2409, and S2411 in FIG. 15, five elements to which "_1" to "_5" have been added at the end of the element names (here, customer_order) are displayed (here m=5), similar to the second embodiment. Specifically, "customer_order_1" to "customer_order_5" are displayed.

Through the above processing, it is even possible to designate, as target elements, some of the elements that can be repeated unlimited times from among descendant elements of a record level element. Thereby, in addition to the effects of the first embodiment and the second embodiment, even XML elements that can be repeated unlimited times are expanded in advance limited times, and displayed, and thus the elements can be associated with a VDP document.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-157318, filed Jul. 1, 2009, which is hereby incorporated by reference herein in its entirety.

The invention claimed is:

1. An information processing apparatus that generates print data for variable-data printing by applying internal data to a variable-data printing document, the information processing apparatus comprising:
    a markup language data structure display unit constructed to read markup language data structure information, and to display a structure of the markup language data;
    a record level candidate element display unit constructed to emphatically display a repeatable element as a candidate of a record level element used as a record level that indicates a record unit by the markup language data structure display unit;
    a record level element designation acceptance unit constructed to accept, from a user, a designation of a record level element from a plurality of candidates displayed emphatically by the record level candidate element display unit;
    a primary key designation acceptance unit constructed to accept a designation of a primary key for each unit based on the record level element;
    a field reference name acceptance unit constructed to accept a designation of a field reference name for each unit based on the record level element;
    a memory for storing computer-executable process steps;
    at least one processor for executing the computer-executable process steps stored in the memory, such that when the computer-executable process steps are executed the at least one processor is operable to function as:
    a variable portion association unit constructed to associate a field reference name designated by the field reference name acceptance unit with a variable portion within a document;
    a markup language data structure conversion unit constructed to convert the record level element so as to have a structure of the internal data; and
    a print data generation unit constructed to generate print data for variable-data print, using the data structure converted by the markup language data structure conversion unit, by applying data for each unit based on the record level element to the variable portion within a document associated by the variable portion association unit,
    wherein the markup language data structure conversion unit converts the record level element for each unit based on the record level element designated by the record level element designation acceptance unit in order to perform a generation in accordance with a user's intent by the variable data generation unit.

2. The information processing apparatus according to claim 1, further comprising a target element acceptance unit constructed to accept from the user, after designation of the record level element is accepted by the record level element designation acceptance unit, designation of a target element that is used as the internal data from the markup language data structure displayed by the markup language data structure display unit, wherein the target element acceptance unit controls so that only a descendant element of the record level element designated by the record level element acceptance unit is targeted, wherein the field reference name acceptance unit controls so that only the designated target element is targeted, and wherein the markup language data structure conversion unit converts the designated target element so as to have the structure of the internal data.

3. The information processing apparatus according to claim 1, further comprising a multiple internal data combining unit constructed to combine the internal data obtained by the conversion performed by the markup language data structure conversion unit, and other data that has the structure of the internal data, and generates internal data to be applied to the variable-data printing document, wherein the multiple internal data combining unit performs based on the primary key accepted by the primary key designation acceptance unit.

4. The information processing apparatus according to claim 1, wherein the markup language data structure display unit includes a limited repeating element determination unit constructed to determine whether an element is able to be repeated a predetermined number of times in the markup language data structure information; and a limited repeating element generation unit constructed to generate the element that is repeated the predetermined number of times as a virtual element newly.

5. The information processing apparatus according to claim 1, wherein the markup language data structure display unit further includes an unlimited repeating element determination unit constructed to determine whether an element is able to be repeated an unlimited times in the markup language data structure information; and an unlimited repeating element generation unit constructed to generate the element being able to be repeated the predetermined number of times as a virtual element newly for the element that is able to be repeated an unlimited times.

6. The information processing apparatus according to claim 1, wherein the markup language data structure display unit includes at least one of an excluded element determination unit constructed to determine whether an element cannot be designated as a target element in the markup language data structure; and an excluded element display unit constructed to perform display showing an element determined that the element cannot be designated as a target element as an excluded element.

7. The information processing apparatus according to claim 1, wherein the markup language data is XML data.

8. The information processing apparatus according to claim 1, wherein the markup language data structure information is either in an XML schema, Relax or DTD format.

9. A control method for an information processing apparatus that generates print data for variable-data printing by applying internal data to a variable-data printing document, the control method comprising:

a step in which a markup language data structure display unit of the information processing apparatus reads markup language data structure information, and displays a structure of the markup language data;

a step in which a record level candidate element display unit of the information processing apparatus emphatically displays a repeatable element as a candidate of a record level element used as a record level that indicates a record unit by the markup language data structure display unit;

a step in which a record level element designation acceptance unit of the information processing apparatus accepts, from a user, a designation of a record level element from a plurality of candidates displayed by the record level candidate element display unit;

a step in which a primary key designation acceptance unit of the information processing apparatus accepts designation of a primary key for each unit based on the record level element;

a step in which a field reference name acceptance unit of the information processing apparatus accepts designation of a field reference name for each unit based on the record level element;

a step in which a variable portion association unit of the information processing apparatus associates a field reference name designated by the field reference name acceptance unit with a variable portion within a document;

a step in which a markup language data structure conversion unit of the information processing apparatus converts the record level element so as to have a structure of the internal data; and a step in which a print data generation unit of the information processing apparatus generates print data for variable-data print, using the data structure converted by the markup language data structure conversion unit, by applying data to the variable portion within a document associated by the variable portion association unit for each unit based on the record level element, wherein the markup language data structure conversion unit converts the record level element for each unit based on the record level element designated by the record level element designation acceptance unit in order to perform a generation in accordance with a user's intent by the variable data generation unit.

10. A non-transitory computer-readable medium storing a program causing a computer to function as:

a markup language data structure display unit that reads markup language data structure information, and displays a structure of the markup language data;

a record level candidate element display unit that emphatically displays a repeatable element as a candidate of a record level element used as a record level that indicates a record unit by the markup language data structure display unit;

a record level element designation acceptance unit that accepts, from a user, a designation of a record level element from a plurality of candidates displayed by the record level candidate element display unit;

a primary key designation acceptance unit that accepts designation of a primary key for each unit based on the record level element;

a field reference name acceptance unit that accepts designation of a field reference name for each unit based on the record level element;

a variable portion association unit that associates a field reference name designated by the field reference name acceptance unit with a variable portion within a document;

a markup language data structure conversion unit that converts the record level element so as to have a structure of the internal data; and a print data generation unit that generates print data for variable-data print, using the data structure converted by the markup language data structure conversion unit, by applying data to the variable portion within a document associated by the variable portion association unit for each unit based on the record level element, wherein the markup language data structure conversion unit converts the record level element for each unit based on the record level element designated by the record level element designation acceptance unit in order to perform a generation in accordance with a user's intent by the variable data generation unit.

* * * * *